United States Patent
Hoernle et al.

(10) Patent No.: US 7,021,701 B1
(45) Date of Patent: Apr. 4, 2006

(54) DRIVER'S CAB EQUIPPED WITH AN EASY CHAIR AND BED

(75) Inventors: Frank Hoernle, Ditzingen (DE); Bernd Kohlbecker, Rastatt (DE); Rainer Konzmann, Ammerbuch (DE); Markus Mattedi, Walddorfhaeslach (DE); Andreas Zygan, Malsch (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/524,998

(22) PCT Filed: Jul. 25, 2003

(86) PCT No.: PCT/EP03/08232

§ 371 (c)(1),
(2), (4) Date: Jul. 29, 2005

(87) PCT Pub. No.: WO2004/022417

PCT Pub. Date: Mar. 18, 2004

(30) Foreign Application Priority Data

Aug. 17, 2002 (DE) .................... 102 37 782

(51) Int. Cl.
*B60P 3/38* (2006.01)
(52) U.S. Cl. .................... 296/190.02; 5/118
(58) Field of Classification Search ......... 296/190.02; 5/118; 297/127
See application file for complete search history.

(56) References Cited

U.S. PATENT DOCUMENTS

| 3,353,194 | A  | * | 11/1967 | Matson ................... 5/118 |
| 4,215,899 | A  | * | 8/1980  | Schmidt et al. ........ 296/190.02 |
| 5,029,929 | A  | * | 7/1991  | Sjostrom et al. ............ 296/69 |
| 6,668,397 | B1 | * | 12/2003 | Olenick et al. ................ 5/118 |
| 6,845,531 | B1 | * | 1/2005  | Kjellberg et al. ............. 5/118 |

FOREIGN PATENT DOCUMENTS

| DE | 3507529 A1 | 9/1986 |
| DE | 4032952 A1 | 4/1992 |
| DE | 10045138 A1 | 4/2002 |
| EP | 1270381 A2 | 1/2003 |
| EP | 1270381 A3 | 7/2003 |

* cited by examiner

*Primary Examiner*—Joseph D. Pape
(74) *Attorney, Agent, or Firm*—Crowell & Moring LLP

(57) ABSTRACT

In order to provide a comfortable rest zone with an easy chair and reclining surface for a driver, even in a confined space, provision is made for a driver's cab for an individual driver to have an easy chair which can be converted into a bed. In this arrangement, a mattress runs over the armrest having an armrest cushion of the easy chair. The armrest cushion cushions the reclining surface, so that the mattress is of as space-saving a design as possible.

18 Claims, 2 Drawing Sheets

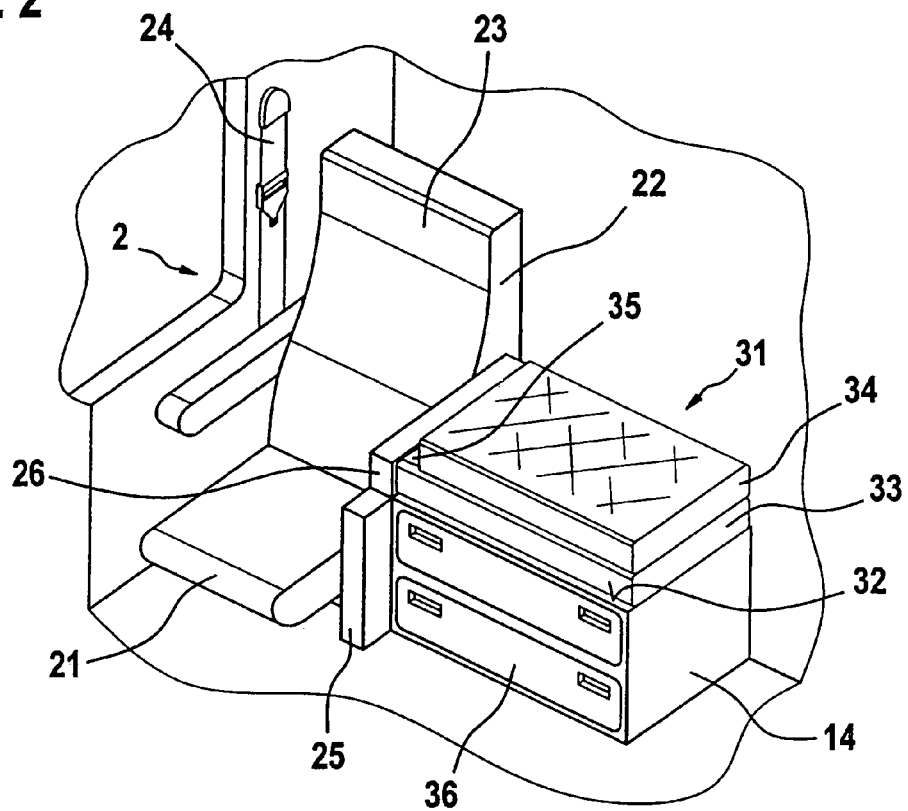
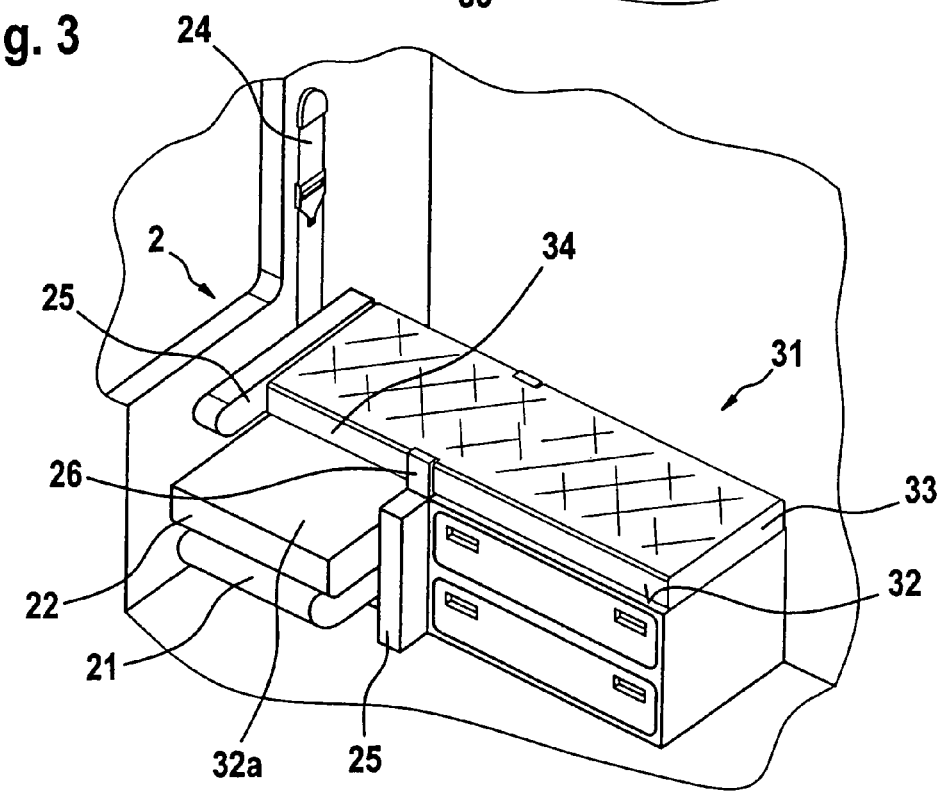

DRIVER'S CAB EQUIPPED WITH AN EASY CHAIR AND BED

BACKGROUND AND SUMMARY OF THE INVENTION

This invention relates to a driver's cab.

A driver's cab disclosed in German document DE 100 45 138 A1 has, arranged next to one another, a driver's seat, a front passenger seat and an easy chair. The seats have foldable backrests which, when folded forward in the direction of travel, form a supporting surface for a mattress. The disadvantages here are that a relatively large amount of space is required and the seats take up a large amount of space in the driver's cab.

German document DE 35 07 529 A1 shows a driver's cab of a commercial vehicle having a bed which can be converted into an emergency seat. The disadvantages here are that the emergency seat is relatively uncomfortable and virtually unusable in the driving mode because of the lack of safety.

German document DE 40 32 952 A1 discloses an armrest having a pivoting fitting. The armrest may be folded over to enlarge a reclining surface. The disadvantages here are that the construction is relatively complicated and the reclining surface provided in this manner has gaps.

In practice, the trend is for single drivers, even in cross border long-distance transport. Such a driver requires, in the driver's cab, suitable relaxation possibilities in addition to an ergonomic workplace.

It is an object of the invention to provide a driver's cab for a commercial vehicle which provides the driver with a comfortable rest zone, is constructed in as compact and space-saving a manner as possible, and preferably has a high-quality spare seat.

This object is achieved according to the invention by a driver's cab as claimed.

The driver's cab has an easy chair with a cushioned armrest. The easy chair is comfortably cushioned, may have a high backrest with an integrated head cushion and can be used by the driver as an easy chair or relaxation chair. The easy chair can be converted into a bed, the armrest cushion of the armrest cushioning a section, preferably a central section or a central part, of a reclining surface. In this case, the armrest extends transversely with respect to the reclining surface and over a large part of the width thereof. As a result, a dual use of the armrest is achieved and a particularly space-saving use of the space is realized. A mattress which additionally cushions the reclining surface extends beyond the armrest of the easy chair and thus forms a continuous and gap-free reclining surface. The reclining surface therefore has no transitions or grooves and is therefore extremely comfortable. In addition to a comfortable easy chair which serves for relaxation during breaks from driving, a high-quality reclining surface is also provided and can be used without restriction as a bed. In this case, the available space is optimally used.

In one advantageous embodiment, provision is made for the mattress, which is of single-part design, to be able to be folded up. It can then be stored in a space-saving manner when not in use, for example during the driving mode. The mattress may have a plurality of cushion elements which are connected foldably to one another at their upper connecting edge. In the region of the armrest, provision is made to arrange the cushion elements at a distance from one another, so that the armrest cushion can engage between the cushion elements and, for its part, cushions part of the reclining surface. The armrest cushion is therefore designed as a reclining surface cushion. The mattress can therefore have a smaller volume while providing the same reclining comfort.

The compact construction of the easy chair and of the bed make it possible, with the same dimensions of the driver's cab, for the space provision in the interior to be improved. If the space provision is unchanged, the external dimensions of the driver's cab could alternatively be reduced.

In one embodiment, provision is made for the backrest of the easy chair to be of foldable design. It can be folded over to form a horizontally aligned supporting surface on which a cushion element of the mattress can be arranged. The rear side of the backrest therefore forms a supporting surface for the mattress. A further supporting surface, which supports one or more cushion elements of the mattress, may be arranged next to the easy chair, adjoining it laterally. The supporting surfaces of the mattress advantageously run approximately at the same height. The supporting surfaces are interrupted by the armrest which projects upward beyond the supporting surfaces.

For the best possible use of the space, provision may be made for one or more comfort elements, e.g. a storage system, to be arranged below the supporting surface. For example, a storage system with storage compartments and/or drawers can be arranged below the supporting surface. It is also possible for a refrigerator or an electronic appliance, for example a car radio or a CD player, to be arranged below the supporting surface.

For optimum reclining comfort, provision is made for the cushion hardness of the armrest to correspond approximately to the cushion hardness of the cushion elements of the mattress. A reclining surface is thus provided which, despite different cushion elements, has a continuously constant cushion hardness.

In one embodiment, provision is made for the easy chair to have a seatbelt. The seatbelt may be designed as a three-point belt which is attached to the wall of the driver's cab. It is also possible for the seatbelt to be designed as a three-point belt which is integrated into the backrest of the easy chair. It is thus possible for the chair to also be used for short distances as a high-quality passenger's seat which corresponds to the safety requirements.

In one embodiment, provision is made to arrange the easy chair or the bed in the rear region of the driver's cab, the driver's seat being arranged in front of the bed. In an individual driving mode, the passenger's seat may be omitted, as a result of which the easy chair has a relatively large amount of foot room which may extend as far as the instrument panel. This free space may be used by a driver, e.g. for changing his clothes.

The mattress is designed in a manner such that it can be folded up and, when not in use, can be folded up in a space-saving manner and stored. When the mattress is stored, the supporting surface of the mattress may be used as a depositing surface or as a writing surface.

Further embodiments of the invention are illustrated and explained in the figures.

BRIEF DESCRIPTION OF THE DRAWINGS

FIG. 2 shows the easy chair with the mattress folded up, and FIG. 3 shows the easy chair converted into the bed.

DETAILED DESCRIPTION OF THE INVENTION

Figure 1:
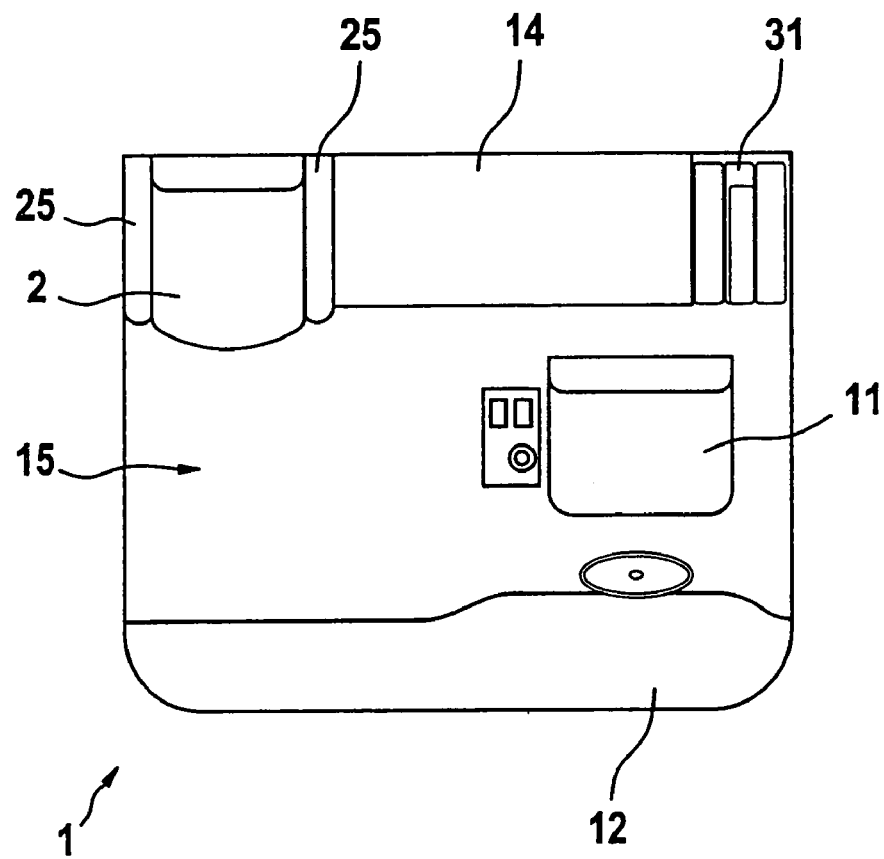
FIG. 1 shows a driver's cab in a schematic plan view together with an easy chair.

FIG. 1 illustrates a driver's cab 1 of a commercial vehicle. The driver's cab 1 is provided with an individual driving package, a "single cab". This provides a single driver with generous furnishings and a generously dimensioned free space within the driver's cab 1. The driver's cab 1 has a driver's seat 11 and an instrument panel 12 with operating elements. An easy chair 2 having a storage system 14 adjacent to it is arranged on the rear wall of the driver's cab 1. The easy chair 2 has armrests 25 and serves as a comfortable easy chair or relaxation chair for the driver during breaks or interruptions to the journey. The easy chair 2 has soft cushioning and has generously dimensioned cushions, so that it permits sitting positions which are as comfortable as possible.

The storage system 14 which is directly laterally adjacent to the easy chair 2 has storage spaces and/or drawers 36. On its upper side, the storage system 14 has a flat depositing surface 32, which can serve as a writing pad and, in addition, is designed as a supporting surface 32 for a mattress 31. The mattress 31, which is of single-piece design, can be folded up and is folded up, for example, for driving as illustrated in FIG. 1, and securely stored in a storage space behind the driver's seat 11.

In the furnishing for an individual driver, the passenger's seat is omitted. Because of the easy chair 2, which is arranged on the rear wall of the driver's cab 1, the driver's cab 1 has, on the passenger's side, a large free space 15 which the driver can use, for example, for changing his clothes. The easy chair 2 has a seatbelt 24, so that it corresponds to the safety requirements and can be used as a passenger's seat in the event of an emergency or for short distances.

FIG. 2 shows a perspective illustration of the rear region of the driver's cab 1 with the easy chair 2 and the storage system 14. The easy chair 2 has a seat cushion 21 and a backrest 22. The backrest 22 runs continuously up to head height and has an integrated head cushion 23. A three-point belt 24 fastened to the wall of the driver's cab 1 ensures the necessary safety of the easy chair 2 in an accident, it then being possible for the chair to be used in the driving mode as an emergency seat. For comfortable sitting, the easy chair 2 has an armrest 25 with an armrest cushion 26.

The storage system 14 is arranged directly laterally adjacent to the easy chair 2. The storage system 14 has flaps and drawers which are to be opened forward in the direction of travel. The mattress 31 is arranged folded up on the upper depositing surface 32 of the storage system 14. A cushion element 33 is arranged directly on the depositing surface 32. The cushion element 33 is connected to the cushion element 34 via a flexible support 35, e.g. a hard-wearing material of blended fabric. The cushion elements 33, 34 are fastened, spaced apart from each other, to the support 35, the distance between the cushion elements 33, 34 corresponding precisely to the dimensions of the armrest cushion 26.

The easy chair 2 can be converted into a bed, as illustrated in FIG. 3. For this purpose, the backrest 22 is of pivotable design, so that it can be folded over forward. The rear side of the backrest 22 then forms a supporting surface for the mattress 31. The rear side of the backrest 22 runs at the same height as the supporting surface 32. The armrest 25 or the armrest cushion 26 protrudes upward beyond the supporting surface 32.

The mattress 31 can then be folded over the supporting surface 32 and the backrest 22 in such a manner that the armrest 25 or the armrest cushion 26 engages between the cushion elements 33 and 34. The support 35 of the mattress 31 then runs continuously over the entire reclining surface of the mattress 31, with the result that the latter has a continuous and groove-free reclining surface. The support 35 protects the armrest cushion 26 against mechanical loads, such as, for example, shearing or abrasion, and connects the cushion elements 33 and 34 to each other at their upper connecting edges.

The armrest cushion 26 cushions the reclining surface. The hardness of the armrest cushion 26 is matched to the hardness of the cushion elements 33 and 34, thus resulting in a comfortable reclining surface. The cushion elements 33 and 34 of the mattress 31 therefore do not have run over the entire length of the reclining surface, and construction volume is saved. A comfortable resting possibility or reclining possibility is therefore provided in the smallest possible space with existing components being used.

Via one or more cushions or seat cushions additionally arranged on top of the reclining surface, the reclining surface of the mattress 31 can be used not only for reclining, but also, for example, as a sofa or couch for comfortable sitting or resting.

The invention claimed is:

1. A driver's cab for a commercial vehicle comprising an easy chair which can be converted into a bed and which is arranged in the direction of travel, the bed having a mattress which forms a gap-free, continuous reclining surface, which extends transversely with respect to the direction of travel, wherein the easy chair has an armrest with an armrest cushion which cushions a section of the reclining surface, and wherein the gap-free, continuous reclining surface extends beyond the armrest.

2. The driver's cab as claimed in claim 1, wherein the mattress is designed so that it can be folded up and has at least two cushion elements which are connected foldably to one another at upper connecting edges and are spaced apart from one another by an extent of the armrest cushion.

3. The driver's cab as claimed in claim 1, wherein the easy chair has a backrest which can be folded over in the direction of travel and, when folded forward, supports a cushion element of the mattress.

4. The driver's cab as claimed in claim 3, wherein first and second parts of the reclining surface are arranged laterally next to the easy chair and directly adjacent to the armrest, and wherein a height of the first part of the reclining surface corresponds to a height of the second part of the reclining surface.

5. The driver's cab as claimed in claim 4, wherein at least one comfort element is arranged below the second part of the reclining surface.

6. The driver's cab as claimed in claim 2, wherein the armrest cushion has approximately the same hardness as the first cushion element, the second cushion element, or both the first cushion element and the second cushion element of the mattress.

7. The driver's cab as claimed in claim 1, wherein the easy chair and the reclining surface are arranged in a rear region of the driver's cab on a rear wall.

8. The driver's cab as claimed in claim 4, wherein a driver's seat is arranged in front of the second part of the reclining surface in the direction of travel, and the easy chair is arranged on a passenger's side so that the easy chair has legroom extending as far as an instrument panel.

9. The driver's cab as claimed in claim 5, wherein the comfort element is any of a storage space, a refrigerated box, an audio appliance, and a drawer.

10. The driver's cab as claimed in claim 2, wherein the easy chair has a backrest which can be folded over in the direction of travel and, when folded forward, supports a cushion element of the mattress.

11. The driver's cab as claimed in claim 10, wherein first and second parts of the reclining surface are arranged laterally next to the easy chair and directly adjacent to the armrest, and wherein a height of the first part of the reclining surface corresponds to a height of the second part of the reclining surface.

12. The driver's cab as claimed in claim 11, wherein at least one comfort element is arranged below the second part of the reclining surface.

13. The driver's cab as claimed in claim 2, wherein the easy chair and the reclining surface are arranged in a rear region of the driver's cab on a rear wall.

14. The driver's cab as claimed in claim 3, wherein the easy chair and the reclining surface are arranged in a rear region of the driver's cab on a rear wall.

15. The driver's cab as claimed in claim 4, wherein the easy chair and the reclining surface are arranged in a rear region of the driver's cab on a rear wall.

16. The driver's cab as claimed in claim 5, wherein the easy chair and the reclining surface are arranged in a rear region of the driver's cab on a rear wall.

17. The driver's cab as claimed in claim 6, wherein the easy chair and the reclining surface are arranged in a rear region of the driver's cab on a rear wall.

18. The driver's cab as claimed in claim 11, wherein a driver's seat is arranged in front of the second part of the reclining surface in the direction of travel, and the easy chair is arranged on a passenger's side so that the easy chair has legroom extending as far as an instrument panel.

* * * * *